(12) United States Patent
Kallahalla et al.

(10) Patent No.: US 8,095,928 B2
(45) Date of Patent: Jan. 10, 2012

(54) METHOD OF FORMING VIRTUAL COMPUTER CLUSTER WITHIN SHARED COMPUTING ENVIRONMENT

(75) Inventors: Mahesh Kallahalla, Palo Alto, CA (US); Mustafa Uysal, Davis, CA (US); Ram Swaminathan, Cupertino, CA (US); Frederic Gittler, Corenc (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 2039 days.

(21) Appl. No.: 10/959,536

(22) Filed: Oct. 6, 2004

(65) Prior Publication Data
US 2006/0075278 A1  Apr. 6, 2006

(51) Int. Cl.
*G06F 9/455* (2006.01)
*G06F 12/00* (2006.01)
*G06F 13/00* (2006.01)
*G06F 13/28* (2006.01)

(52) U.S. Cl. ............................................ 718/1; 711/163
(58) Field of Classification Search ...................... None
See application file for complete search history.

(56) References Cited

U.S. PATENT DOCUMENTS

| | | | | |
|---|---|---|---|---|
| 6,668,322 | B1 * | 12/2003 | Wood et al. | 713/182 |
| 7,137,004 | B2 * | 11/2006 | England et al. | 713/176 |
| 2003/0055972 | A1 * | 3/2003 | Fuller et al. | 709/226 |
| 2003/0115218 | A1 * | 6/2003 | Bobbitt et al. | 707/200 |
| 2005/0289540 | A1 * | 12/2005 | Nguyen et al. | 718/1 |

OTHER PUBLICATIONS

Anderson, et al., Ergastulum: quickly finding near-optimal storage system designs, 2001.

Barham, et al., Xen and the Art of Virtualization, SOSP'03, Oct. 19-22, 2003, Bolton Landing, New York, USA, ACM.

Chase, et al., Dynamic Virtual Clusters in a Grid Site Manager, 2003.

Kotov, V., on Virtual Data Centers and their Operating Environments, Technical Report HPL-2001-44, Mar. 16, 2001, HP Laboratories, Palo Alto, CA.

Milojicic, et al., Appliance Aggregation Architecture (A3), Technical Report HPL-2003-140, Jul. 14, 2003, HP Laboratories, Palo Alto, CA.

Graupner, et al., Adaptive Control System for Server Groups in Enterprise Data Centers, Technical Report HPL-2003-273, Jan. 14, 2004, HP Laboratories, Palo Alto, CA.

Kallahalla, et al., Plutus: Scalable Secure File Sharing on Untrusted Storage, Proceedings of the 2nd Conference on File and Storage Technologies (FAST'03), pp. 29-42, Mar. 3-Apr. 2, 2003, San Francisco, CA, USENIX, Berkeley, CA.

Mahalingam, et al., Locating Logical Volumes in Large-Scale Networks, 2002.

(Continued)

*Primary Examiner* — Kevin Ellis
*Assistant Examiner* — Gary W Cygiel

(57) ABSTRACT

An embodiment of a method of forming a virtual computer cluster within a shared computing environment begins with a step of placing gatekeeper software on each of a plurality of particular host computers of the shared computing environment. The method continues with a step of assigning computing platforms located on the particular host computers to the virtual computer cluster. The gatekeeper software interposes between the computing platforms and hardware resources of the particular host computers. The method concludes with a step of isolating the virtual computer cluster from a remainder of the shared computing environment using the gatekeeper software. The gatekeeper software allows communication between the computing platforms while precluding communication with other computing platforms of the shared computing environment. The gatekeeper software controls input and output operations for the virtual computer cluster.

37 Claims, 6 Drawing Sheets

OTHER PUBLICATIONS

Moore, el al., Managing Mixed-Use Clusters with Cluster-on-Demand, 2002.

Osman, et al., The Design and Implementation of Zap: A System for Migrating Computing Environments, Proceedings of the 5th Symposium on Operating Systems Design and Implementation (OSDI 2002), Dec. 2002, Boston, MA.

VMware, Improving Economics of Blades Using VMware, [online] [retrieved Oct. 1, 2004] <http://wwww.vmware.com/pdf/vmware_blades.pdf>.

Whitaker, et al., Constructing Services with Interposable Virtual Hardware, Mar. 2004.

* cited by examiner

METHOD OF FORMING VIRTUAL COMPUTER CLUSTER WITHIN SHARED COMPUTING ENVIRONMENT

RELATED APPLICATIONS

This application is related to U.S. application Ser. Nos. 10/959,698 and 10/959,851, filed on Oct. 6, 2004, the contents of which are hereby incorporated by reference.

FIELD OF THE INVENTION

The present invention relates to the field of computing. More particularly, the present invention relates to the field of computing where resources are shared by users.

BACKGROUND OF THE INVENTION

A typical shared computing environment such as a utility data center includes computers, disk arrays, a LAN (local area network), and a SAN (storage area network). The LAN couples the computers together. The SAN couples at least some of the computers (e.g., storage servers) to the disk arrays. Users run applications on the shared computing system to produce results.

Some shared computing environments include VLAN (virtual LAN) devices in the LAN and storage access restriction devices in the SAN. Such shared computing environments include an ability to divide the servers and storage resources into computer clusters. Network traffic for a particular computer cluster is maintained within the particular computer cluster using the VLAN devices. Storage I/O (input/output) for the particular computer cluster is isolated using the storage access restriction devices. Thus, the VLAN devices and the storage access devices provide an ability to form computer clusters in a shared computing environment.

Many shared computing environments exist which do not include the VLAN devices or the storage access restriction devices. Adding the VLAN or storage access restriction devices to existing networks incurs cost for both the devices and the effort to reconfigure the shared computing environment. Even when building a new shared computing environment, the VLAN devices and the storage access restriction devices increase the cost of the shared computing environment. Thus, it would be more efficient to be able to form computer clusters in shared computing environments which do not include such devices. Also, it would be desirable to be able to arbitrarily assign portions of servers to a computer cluster while maintaining isolation between the computer cluster and a remainder of the shared computing environment.

What is needed is a more efficient method of forming a computer cluster within a shared computing environment.

SUMMARY OF THE INVENTION

The present invention comprises a method of forming a virtual computer cluster within a shared computing environment. According to an embodiment, the method begins with a step of placing gatekeeper software on each of a plurality of particular host computers of the shared computing environment. The method continues with a step of assigning computing platforms located on the particular host computers to the virtual computer cluster. The gatekeeper software interposes between the computing platforms and hardware resources of the particular host computers. The method concludes with a step of isolating the virtual computer cluster from a remainder of the shared computing environment using the gatekeeper software. The gatekeeper software allows communication between the computing platforms while precluding communication with other computing platforms of the shared computing environment. The gatekeeper software controls input and output operations for the virtual computer cluster.

These and other aspects of the present invention are described in more detail herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

According to an aspect, the present invention comprises a method of forming a virtual computer cluster within a shared computing environment (e.g., a utility data center). According to another aspect, the present invention comprises a method managing a host computer in a shared computing environment. According to another aspect, the present invention comprises a method of providing storage to a virtual computer cluster within a shared computing environment.

Figure 1:
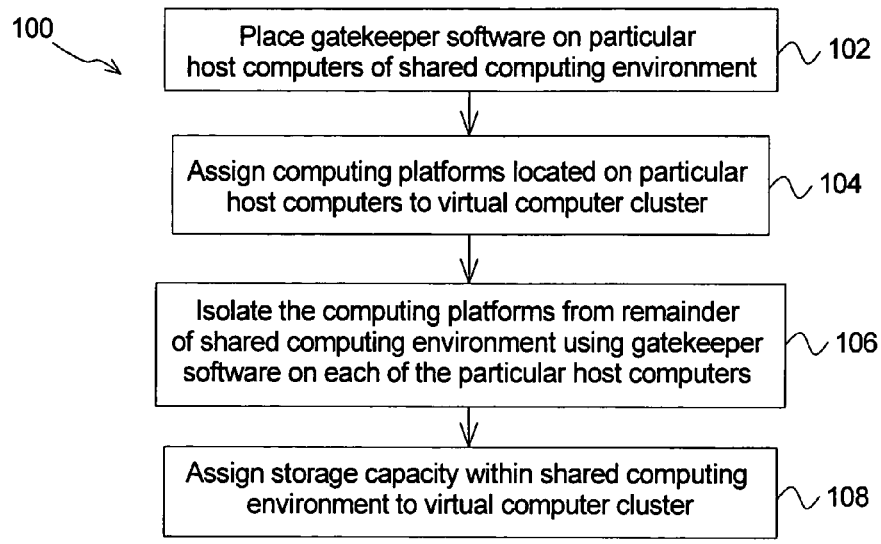
FIG. 1 illustrates an embodiment of a method of forming a virtual computer cluster within a shared computing environment of the present invention as a flow chart.

An embodiment of a method of forming a virtual computer cluster within a shared computing environment is illustrated as a flow chart in FIG. 1. The method 100 begins with a first step 102 of placing gatekeeper software on particular host computers of the shared computing environment. The method 100 continues with a second step 104 of assigning computing platforms located on the particular host computers to the virtual computer cluster. The gatekeeper software interposes between the computing platforms and hardware resources of the particular host computers. An embodiment of a shared computing environment (e.g., a utility data center) upon which the method 100 forms the virtual computer cluster is illustrated schematically in FIG. 2. The shared computing environment 200 comprises host computers 202, disk arrays 204, a SAN (storage area network) 206, and a LAN (local area network) 208. The SAN 206 couples the host computers 202 to the disk arrays 204. The LAN 208 couples the host computers 202 together. In an embodiment, the LAN 208 couples to a wide area network 210 (e.g., the Internet). Each host computer 202 comprises a processor 212, memory 214, an HBA (host bus adapter) 216, and a NIC (network interface card) 218. The HBAs 216 couple the host computers 202 to the SAN 206. The NICs 218 couple the host computers 202 to the LAN 208. A disk array 220 couples to a first host computer 202A. The disk array 220 comprises direct attached storage for the first host computer 202A. The direct attached storage comprises local storage for the first host computer 202A. The host computers 202 may be clients which access the disk arrays 204. Or, the host computers 202 may be servers which access the disk arrays 204 for clients (not shown).

According to an embodiment, the first step 102 of the method 100 (FIG. 1) assigns first and second computing platforms to the virtual computer cluster. The first and second computing platforms reside on the first host computer 202A and a second host computer 202B, respectively. The first computing platform and the first host computer 202A comprise a first computer system. The second computing platform and the second host computer 202B comprise a second computer system.

Figure 3:
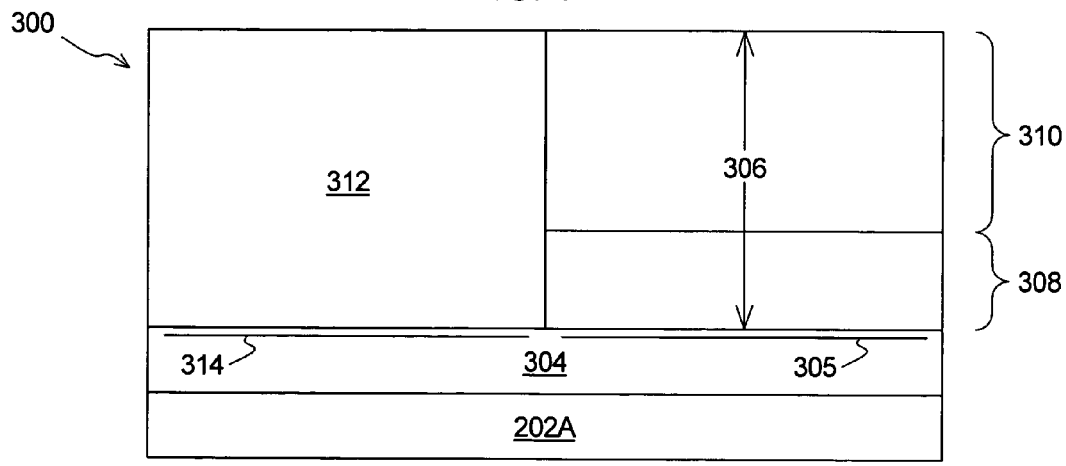
FIG. 3 schematically illustrates an embodiment of a first computer system of the present invention.

An embodiment of the first computer system is schematically illustrated in FIG. 3. The first computer system 300 comprises the first host computer 202A (illustrated as a block), a first virtual machine monitor 304, and the first computing platform 306. The first virtual machine monitor 304 provides a virtual machine interface 305 to the first computing platform 306. Here, the first computing platform 306 is a first virtual machine which includes an operating system kernel 308. In operation of the virtual computer cluster, the first computing platform 306 boots an operating system which includes the operating system kernel 308. The user of the virtual computer cluster is given administrative access to the computing platform 308 (e.g., access to the root account in Unix systems or Administrator account in Windows systems). The user may then customize the operating system kernel 308 and run an application(s) or service(s) in the operating system kernel or at a user level 310. The virtual machine interface 305 precludes direct access by the user of the virtual computer cluster to hardware of the first host computer 202A. The user of the virtual computer cluster may be given root access to the operating system located within the first computing platform 306 but is prevented from directly accessing the hardware of the first host computer 202A by the first virtual machine monitor 304.

In general, a cluster administrator of the virtual computer cluster will be given root access to the operating system located within the first computing platform 306 while other users of the virtual computer cluster will be given more limited access. Whether the other users receive the root access or the more limited access is within the discretion of the cluster administrator or the policies that the cluster administrator is directed to employ.

In an embodiment, the first computer system 300 further comprises another virtual machine 312, which may be used as another computing platform by another user. In operation, the user of the first computing platform 306 (i.e., the first virtual machine) and the other user of the other computing platform (i.e., the other virtual machine 312) will typically each run an operating system and one or more applications that are isolated from the other's virtual machine and that are transparent to the other's virtual machine. In another embodiment, the first computer system 300 further comprises a plurality of additional virtual machines.

Figure 4:
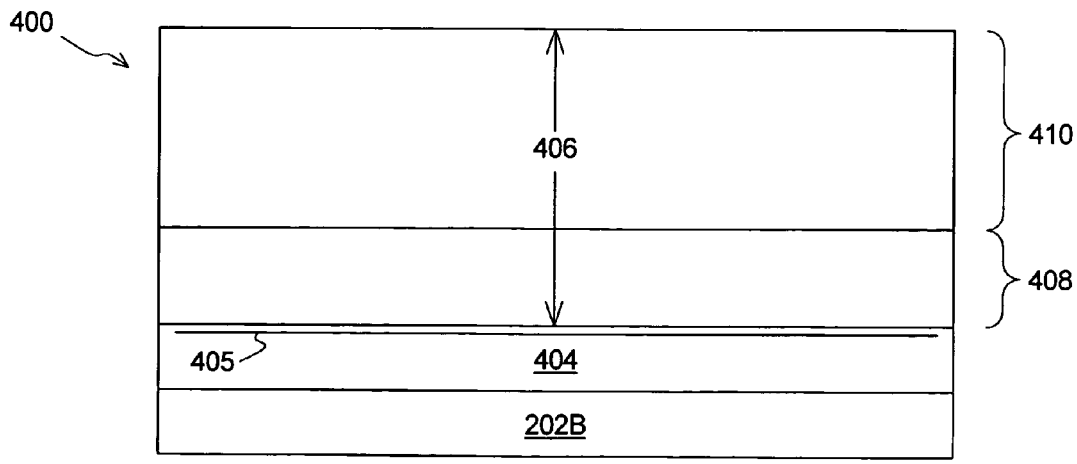
FIG. 4 schematically illustrates an embodiment of a second computer system of the present invention.

An embodiment of the second computer system is illustrated schematically in FIG. 4. The second computer system 400 comprises the second host computer 202B (illustrated as a block), a second virtual machine monitor 404, and the second computing platform 406. The second virtual machine monitor 404 provides a virtual machine interface 405 to the first computing platform 406. Here, the second computing platform 406 is a second virtual machine. In alternative embodiments, the second computer system 400 further comprises one or more additional virtual machines.

Figure 2:
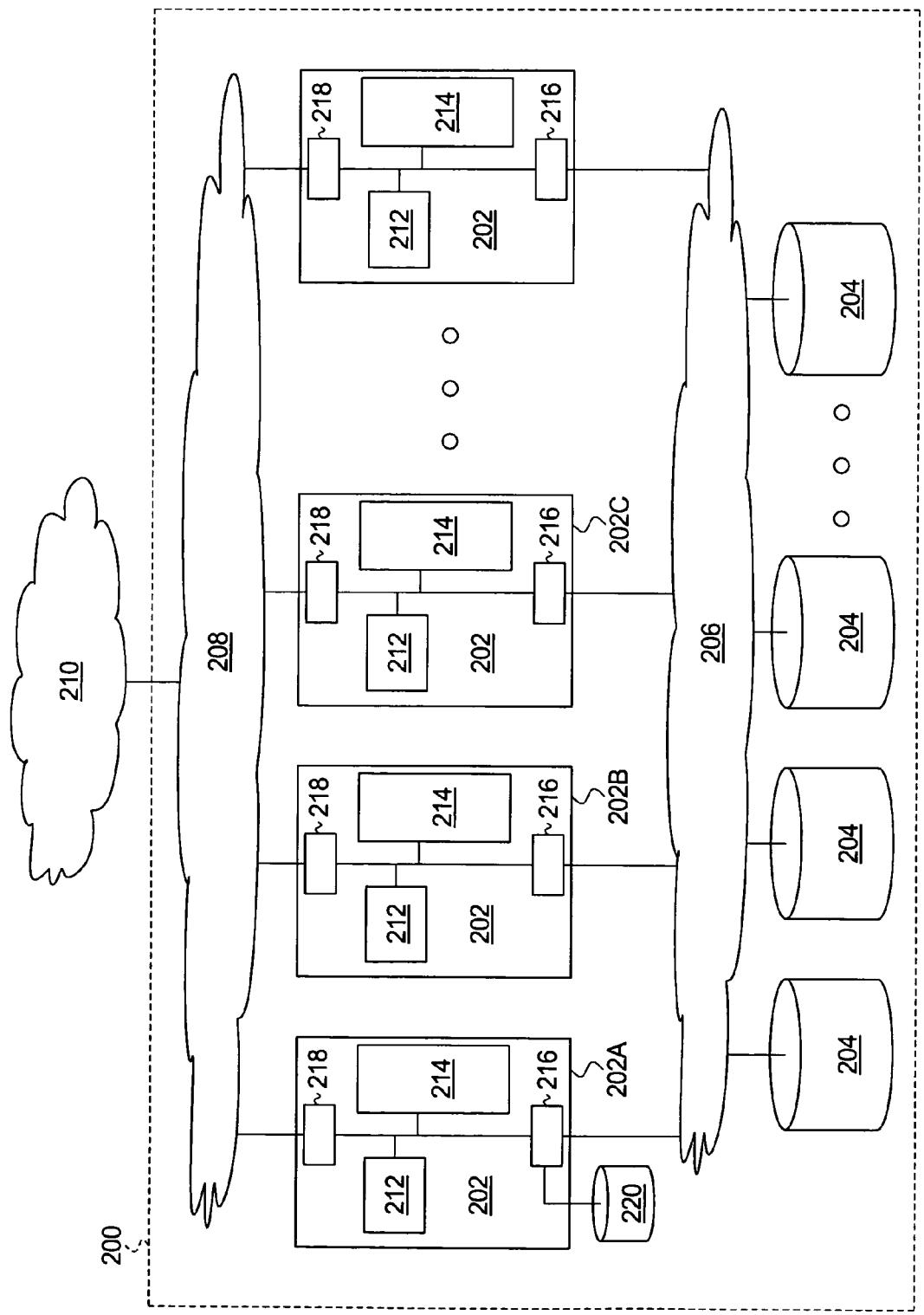
FIG. 2 schematically illustrates an embodiment of a shared computing environment upon which methods of the present invention are employed.

According to an embodiment, the method 100 (FIG. 1) concludes with a third step 106 of isolating the virtual computer cluster including the first and second computing platforms, 306 and 406, (FIGS. 3 and 4) from a remainder of the shared computing environment 200 (FIG. 2). The third step 106 uses gatekeeper software located on host computers of the virtual computer cluster including the first and second host computers, 202A and 202B, to perform the isolation. The gatekeeper software allows communication between the computing platforms of the virtual computer cluster while precluding communication with other computing platforms within the shared computing environment. The gatekeeper software also controls input and output operations for the computer cluster.

In an embodiment, the gatekeeper isolates the virtual computer cluster from the remainder of the shared computing environment by keeping a table of resources of the virtual computer cluster (e.g., computing platforms and virtual storage) and allowing network and input/output traffic only within the resources identified in the table. The table may identify resource as network addresses, hardware identifiers, internally generated numbers unique identifiers (e.g., virtual server IDs), vendor specific unique identifiers (e.g., worldwide names), or other identifiers. Users of the virtual computer cluster may only access the resources in the table. Preferably, the users of the virtual computer cluster are also prevented from detecting resources in the shared computing environment which are not listed in the table.

In an embodiment, the gatekeeper software resides within the first and second virtual machine monitors, 304 and 404, of the first and second computer systems 300 and 400 (FIGS. 3 and 4). Since the first and second virtual machine monitors, 304 and 404, are separated from the first and second computing platforms, 306 and 406, by virtual machine interfaces which protect against access to the first and second virtual machine monitors, 304 and 404, the gatekeeper software is protected against non-physical tampering by the user of the virtual computer cluster. In an embodiment the user of the virtual computer cluster is not granted physical access to the shared computing environment 200, which protects the gatekeeper software against physical tampering by the user of the virtual computer cluster. In another embodiment, the host computers 202 of the shared computing environment 200 include trusted computing modules which protect against physical tampering with the gatekeeper software by the users of shared computing environment 200. Preferably, the trusted computing modules meet standards put forth by the Trusted Computing Group, an industry standards body.

In alternative embodiment, the method 100 further comprises a fourth step 108 of assigning a storage capacity from within the shared computing environment to the virtual computer cluster.

Figure 5:
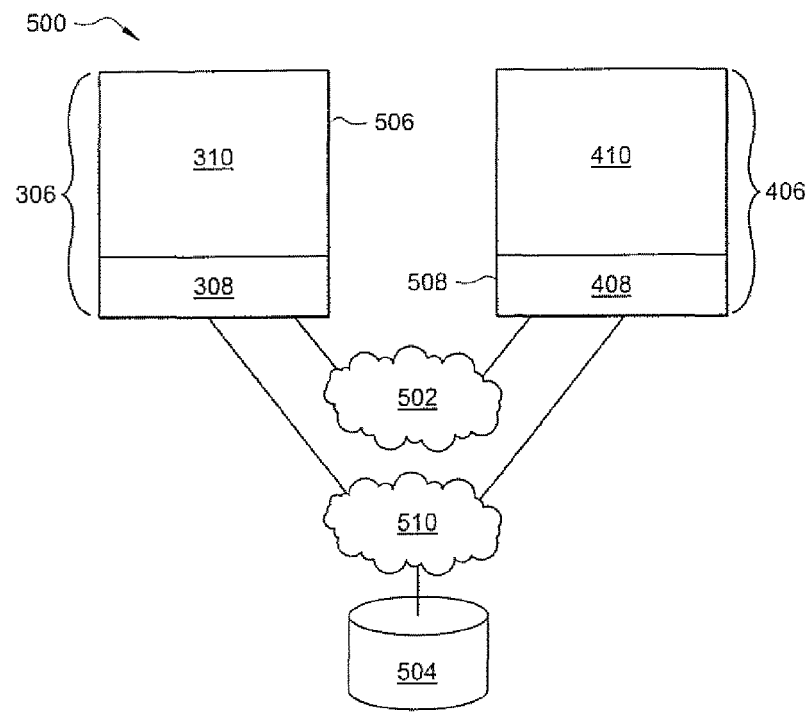
FIG. 5 schematically illustrates an embodiment of a virtual computer cluster formed by a method of the present invention.

An embodiment of the virtual computer cluster is illustrated schematically in FIG. 5. The virtual computer cluster comprises the first and second computing platforms, 306 and 406, coupled together by a virtual network 502. The first and second virtual machine interfaces, 305 and 405 (FIGS. 3 and 4), and the first and second virtual machine monitors, 304 and 404, are transparent to the first and second computing platforms, 306 and 406, and therefore do not appear in the virtual computer cluster 500 (FIG. 5). Instead, the user of the virtual computer cluster 500 perceives first and second virtual computers, 506 and 508, as the computing platforms of the virtual computer cluster. The first and second virtual machine interfaces, 305 and 405 (FIGS. 3 and 4) protect against the user of the virtual cluster 500 (FIG. 5) accessing or even viewing the gatekeeper software of the first and second virtual machine monitors, 304 and 404 (FIGS. 3 and 4). This in conjunction with the gatekeeper software protects against the user of the virtual computer cluster 500 accessing resources within a remainder of the shared computing environment 200 (FIG. 2), which are outside of the virtual computer cluster 500 (FIG. 5).

In an embodiment, the virtual computer cluster further comprises virtual storage 504, which is coupled to the first and second computing platforms, 306 and 406, by a virtual SAN 510. In an embodiment which includes the virtual storage 504, the gatekeeper software forms the virtual storage by allowing access to a portion of storage resources in the shared computing environment 200 (FIG. 2) while precluding access to a remainder of the storage resources. In another embodiment, the virtual computer cluster 500 further comprises one or more additional computing platforms (not shown).

In an embodiment, the virtual computer cluster 500 (FIG. 5) comprises one of a plurality of virtual computer clusters within the shared computing environment 200 (FIG. 2). Here, the method 100 (FIG. 1) is employed to form each of the virtual computer clusters. Each virtual computer cluster forms a secure environment which precludes access to the virtual computer cluster by users of other virtual computer clusters. To a user of one of the virtual computer clusters, other virtual computers clusters are not detectable (i.e., the other virtual computer clusters and their associated virtual storage are not visible from within the virtual computer cluster).

The gatekeeper software of the first and second virtual machine monitors, 304 and 404, also protects against access to the first and second computing platforms, 306 and 406, by other users of the shared computing environment 200. In an embodiment, the gatekeeper software protects against unauthorized access to the first and second computing platforms, 306 and 406, by employing a table that recognizes a list of computing platforms that are allowed to send traffic to each other and a list of storage resources which the computing platforms can access (e.g., read and write data). Attempts to access the first and second computing platforms, 306 and 406, that originate from computing platforms not within the table are rejected. Also, attempts to access the storage resources assigned to the first and second computing platforms, 306 and 406, that originate from computing platforms not within the table are rejected.

Network traffic between the first and second computing platforms, 306 and 406, and I/O (input/output) for the virtual storage 504 over the virtual network 502 is protected against unauthorized access by the other users in one of a variety of ways. In an embodiment, all users other than an administrator of the shared computing environment 200 are isolated within their own virtual computer clusters by the gatekeeper software. In another embodiment, the gatekeeper software of the first and second virtual machine monitors, 304 and 404, uses encryption for the network traffic between the first and second computing platforms, 306 and 406, and the I/O for the virtual storage 504 to protect against unauthorized access to data which belongs to the virtual computer cluster 500 while the data is outside of the first and second computing platforms, 306 and 406.

According to an embodiment, a management station of the shared computing environment 200 (FIG. 2) performs the method 100 (FIG. 1). The gatekeeper software recognizes that the management station is a trusted source. In an embodiment, the management station is a stand-alone computer (not shown) of the shared computing environment 200. In another embodiment, the management station resides within a virtual machine on one of the host computers 202 of the shared computing environment 200. For example, the management station may reside in the third virtual machine 312 (FIG. 3). According to this example, the management station interfaces with the virtual machine monitor 304 and other virtual machine monitors of the shared computing environment 200 through a management API (application program interface) 314. The management API 314 provides the management station access to the gatekeeper software of the host computers 202 of the shared computing environment 200.

In an embodiment, a plurality of management stations within the shared computing environment 200 (FIG. 2) cooperate to perform the method 100 (FIG. 1). For example, first and second management stations may reside within the first and second computer systems, 300 and 400 (FIGS. 3 and 4). The first and second management stations cooperate to perform the method 100.

Figure 6:
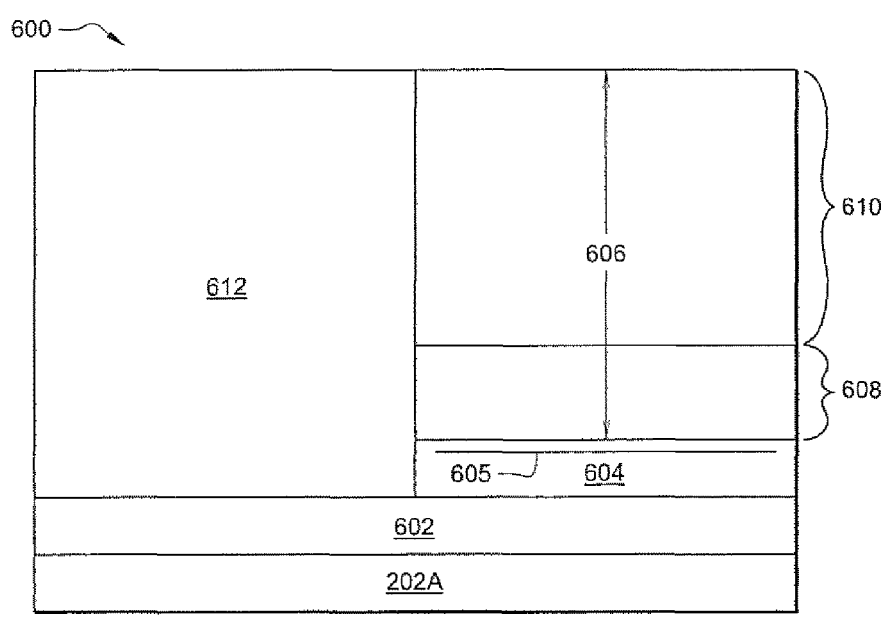
FIG. 6 schematically illustrates an embodiment of an alternative computer system of the present invention.

An alternative embodiment of the first computer system is illustrated schematically in FIG. 6. The first computer system 600 comprises the first host computer 202A (illustrated as a block), a first operating system 602, a first virtual machine monitor 604, and a first computing platform 606. The first virtual machine monitor 604 provides a virtual machine interface 605 to the first computing platform 606. Here, the first computing platform 606 is a first virtual machine.

In operation of the virtual computer cluster, a second operating system including an operating system kernel 608 will typically be installed on the first computing platform 606 and the user will typically run an application or applications at a user level 610 of the first computing platform 606. The virtual machine interface 605 precludes direct access by the user of the virtual computer cluster to the first operating system 602 or hardware of the first host computer 202A. The user of the virtual computer cluster may be given root access to the second operating system located within the first computing platform 606. But even with root access, the virtual machine interface 605 protects against the user accessing the first operating system 602 or the hardware of the first host computer 202A.

The first computer system 600 may also include one or more additional virtual machines (not shown). In an embodiment, the gatekeeper software resides in the first operating system 602. In another embodiment, the gatekeeper software resides in the first virtual machine monitor 604. In an embodiment, the management station resides in a management platform 612 of the first computer system. Here, the management platform 612 interfaces directly with the first operating system 602 (i.e., not through the first virtual machine monitor 604).

Figure 7:
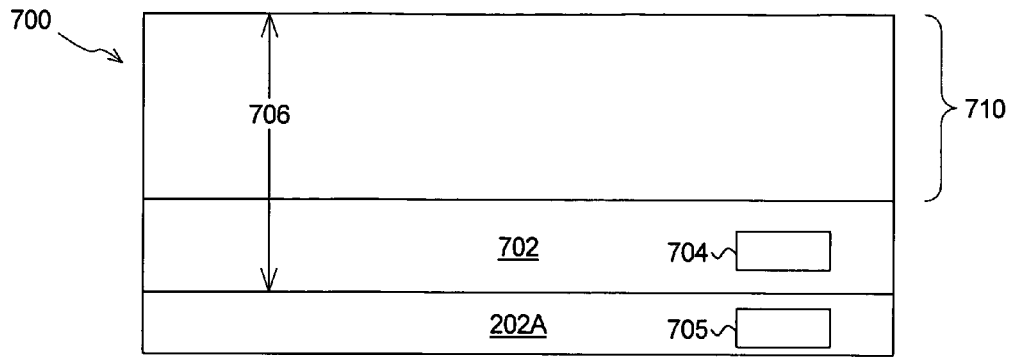
FIG. 7 schematically illustrates an embodiment of another alternative computer system of the present invention.

Another alternative embodiment of the first computer system is illustrated schematically in FIG. 7. The first computer system 700 comprises the first host computer 202A (illustrated as a block) and a first computing platform 706. The first computer 202A includes a trusted computing module 705.

The first computing platform 706 comprises a first operating system, including an operating system kernel 702, and a user level 710. The first operating system includes an OS (operating system) daemon 704, which comprises the gatekeeper software. The trusted computing module 705 protects against non-physical tampering by the user of the virtual computer cluster. Here, the first computing platform 706 is a real machine (i.e., the first computing platform does not share hardware resources with other computing platforms).

In operation of the virtual computer cluster, a user will typically run an application or applications at the user level 710 of the first computing platform 706. The user of the virtual computer cluster may be given root access to the first operating system 702 but is precluded from non-physical tampering with the OS daemon 704 by the trusted computing module 705. Here, the management station does not reside on the first computer because, with the exception of the OS daemon 704, the user of the virtual computer cluster has access to a remainder of an available computing environment (i.e., the first computing platform 706) of the first computer system 700. If a user of the first computing platform 706 attempts to tamper with the OS daemon 704, the trusted computing module 705 may alert the management station. In such a situation, the management station may quarantine the first computing platform to ensure that the user who is attempting malicious activity is prevented from causing harm within the shared computing environment. In an embodiment, the user of the virtual computer cluster is not granted physical access to the trusted computing module 705, which protects against physical tampering with the OS daemon 704 by the user of the virtual computer cluster.

An alternative shared computing environment which employs the method 100 (FIG. 1) of forming the virtual computer and other methods of the present invention comprises the shared computing environment 200 (FIG. 2) and additional host computers which couple to the LAN 208 but which do not connect to the SAN 206. Instead, the additional host computers couple to the SAN 206 via the LAN 208 and the host computers 202.

Another alternative shared computing environment which employs the method 100 (FIG. 1) of forming the virtual computer cluster and other methods of the present invention comprises the shared computing environment 200 (FIG. 2) and additional host computers which couple to the shared computing environment 200 via the WAN 210.

Figure 8:
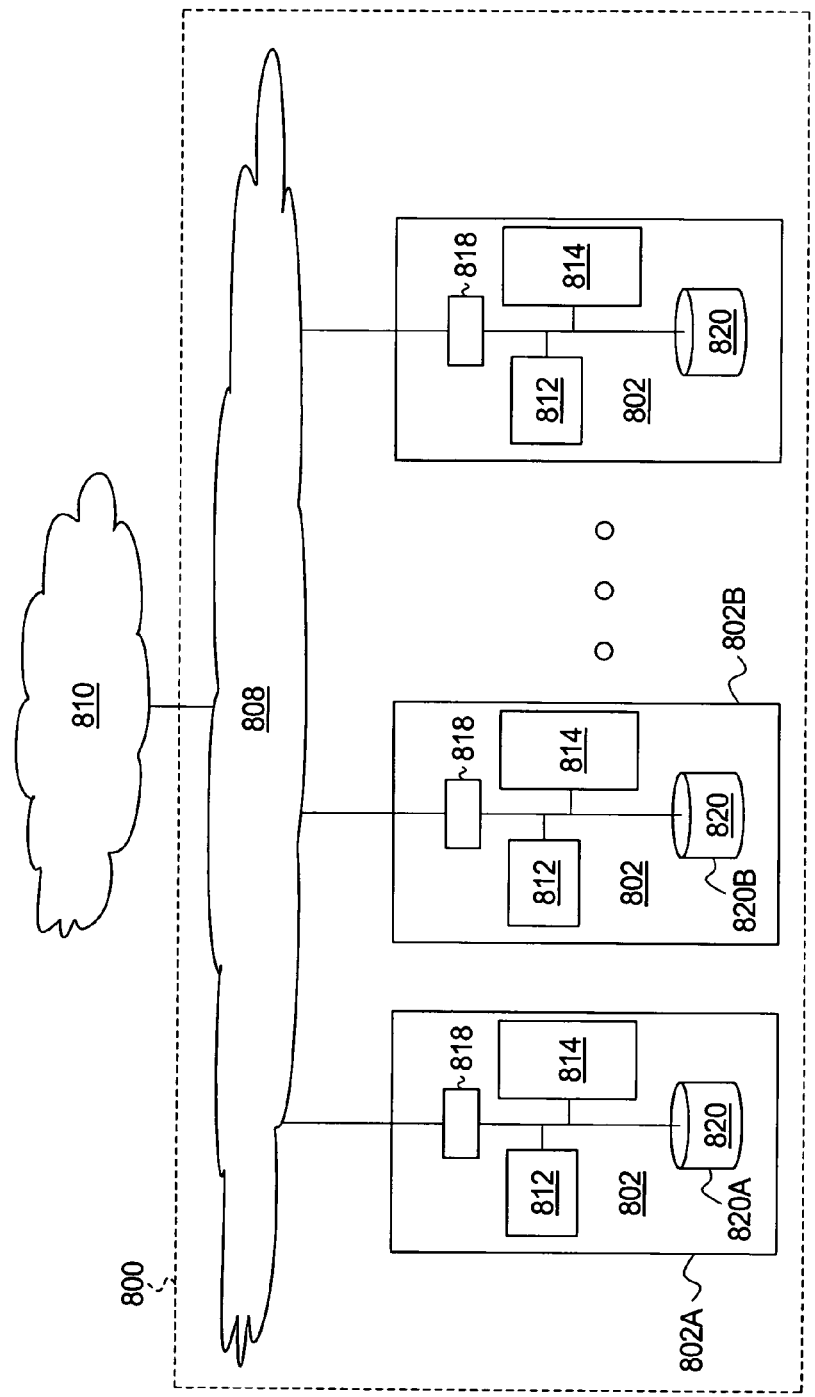
FIG. 8 schematically illustrates another embodiment of a shared computing environment upon which methods of the present invention are employed.

Another alternative shared computing environment which employs the method 100 (FIG. 1) of forming the virtual computer cluster and other methods of the present invention is illustrated schematically in FIG. 8. The alternative shared computing environment 800 comprises a plurality of host computers 802 (e.g., desktop computers) coupled together by a LAN 808. Each host computer 802 comprises a processor 812, memory 814, a network interface 818, and storage 820. In an embodiment, the alternative shared computing environment 800 couples to a WAN 810.

It will be readily apparent to one skilled in the art that numerous shared computing environments are appropriate for instantiations of the methods of the present invention. Further, it will be readily apparent to one skilled in the art that the shared computing environments discussed herein are only a few of the possible shared computing environments appropriate for instantiations of the methods of the present invention.

Figure 9:
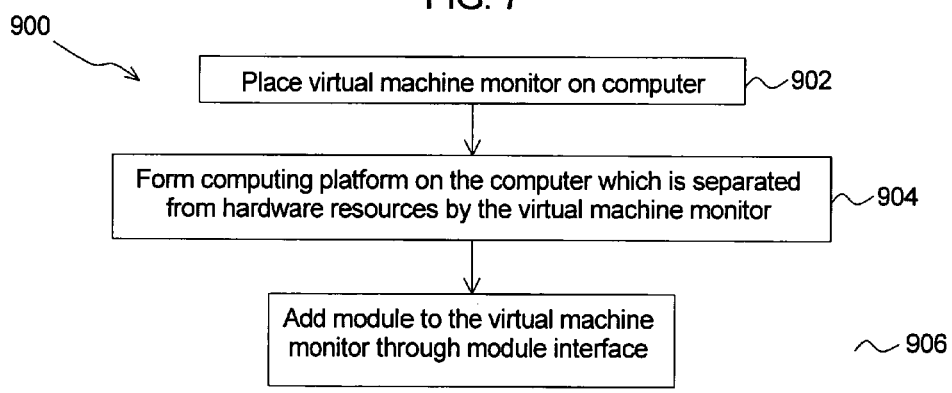
FIG. 9 illustrates an embodiment of a method of managing a computer system of the present invention as a flow chart.

An embodiment of a method of managing a computer system (e.g., a host computer system) of the present invention is illustrated as a flow chart in FIG. 9. The method 900 begins with a first step 902 of placing a virtual machine monitor on a computer. The virtual machine monitor includes an interface for a module. The interface comprises computer code which recognizes the module, which allows the virtual machine monitor and the module to communicate, and which recognizes a security key in the module. The security key verifies that the module is being provided by a trusted source that is allowed to add the module to the virtual machine monitor. The method 900 continues with a second step 904 of forming a computing platform on the computer. The virtual machine monitor interposes between the computing platform and hardware resources of the computer and provides access control to the hardware resources for software executing on the computing platform.

Figure 10:
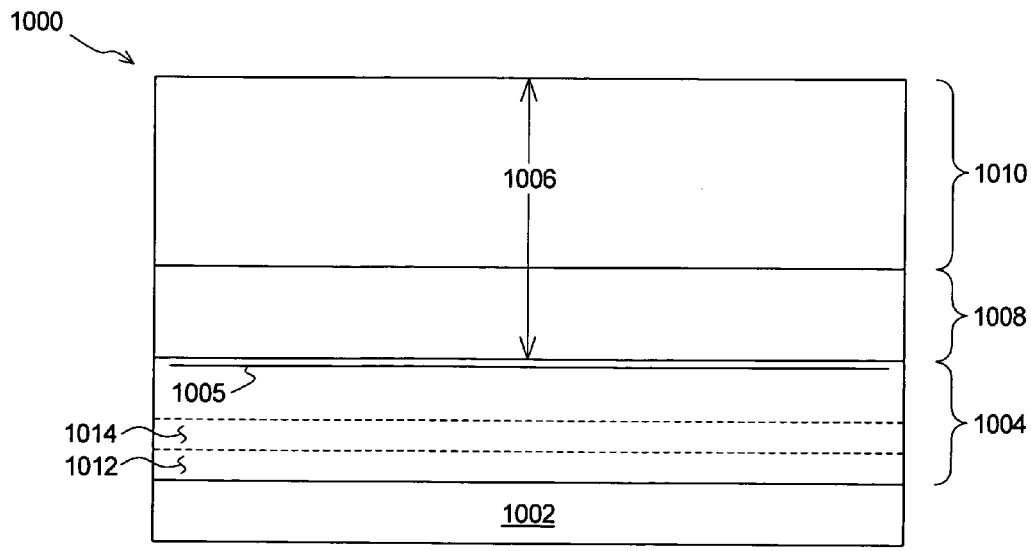
FIG. 10 schematically illustrates an embodiment of a computer system of the present invention.

An embodiment of a computer system which is managed by the method 900 is illustrated schematically in FIG. 10. The computer system 1000 comprises the computer hardware 1002 (e.g., a processor, memory, and a network interface), the virtual machine monitor 1004, and the computing platform 1006. Here, the computing platform 1006 is a virtual machine which includes an operating system including an operating system kernel 1008. Typically, in operation, a user of the computing platform 1006 will run an application or applications at a user level 1010 of the computing platform 1006. The virtual machine monitor 1004 includes a virtual machine interface 1005 which protects against non-physical tampering with the virtual machine monitor 1004 or the computer hardware 1002 by the user of the computing platform 1006. The computer system 1000 may further comprise one or more additional computing platforms (i.e., one or more additional virtual machines).

According to an embodiment, the method 900 (FIG. 9) concludes with a third step 906 of adding a module 1012 (FIG. 10) to the virtual machine monitor 1004 through the interface. The third step 906 may be performed by an administrator of the computer system 1000 from a management station for the computer system 1000. Unlike a loadable module (e.g., for the operating system) which may be installed by the user of the computing platform 1006, the module 1012 requires authorization for installation. It is this feature that distinguishes the module 1012 from the loadable module. Here, the management station has authorization to install the module 1012. Preferably, the virtual machine monitor 1004 and the module 1012 are transparent to the user of the computing platform 1006. The module 1012 enhances a functionality of the virtual machine monitor (e.g., by enhancing the functionality of the gatekeeper software), which is described more fully below.

According to an alternative embodiment, the method 900 (FIG. 9) further comprises adding one or more additional modules 1014 (FIG. 10) to the virtual machine monitor 1004. The additional modules 1014 may couple to other interfaces of the virtual machine monitor 1004. Alternatively, the additional modules 1014 may interface through a stacking mechanism in which the module 1012 couples to the interface of the virtual machine monitor 1004, a first additional module couples to the module 1012 through a second interface which is part of the module 1012, and a second additional module couples to the first additional module via a third interface which is part of the first additional module.

In an embodiment, the virtual machine monitor 1004 includes gatekeeper software that places the computing platform 1006 within a virtual computer cluster of a shared computing environment. Here, other gatekeeper software located within one or more other virtual machine monitors place other computing platforms within the virtual computer cluster. The module 1012 enhances a functionality of the gatekeeper software, which is described more fully below.

In a gatekeeper enhancement embodiment, the module 1012 encrypts out-bound data leaving the computer platform 1006 and decrypts in-bound data destined for the computing platform 1006. According to such an embodiment, the management station provides encryption and decryption keys to the module 1012.

In another gatekeeper enhancement embodiment, the module 1012 provides access to virtual storage within a virtual computer cluster of a shared computing environment. The storage access may include encrypting data output to the virtual storage and decrypting data received from the virtual storage. The virtual storage may comprise a virtualized and consolidated portion of storage resources for a data center.

In another gatekeeper enhancement embodiment, the module 1012 performs traffic monitoring for the computing platform 1006. In yet another gatekeeper enhancement embodiment, the module 1012 performs traffic control for the computing platform 1006. For example, the module 1012 may perform traffic admission control to the computing platform 1006. Or, the module 1012 may perform traffic throttling. The management station for the gatekeeper software may provide traffic control parameters to the module 1012. The management station may periodically update the traffic control parameters.

In another gatekeeper enhancement embodiment, the module 1012 monitors an operating system in operation within the computing platform 1006. In yet another gatekeeper enhancement embodiment, the module 1012 monitors the computer hardware 1002.

In another gatekeeper enhancement embodiment, the module 1012 migrates an application executing within the computing platform 1006 to another computing platform. The other computing platform may reside on the computer hardware 1002. Alternatively, the other computing platform may reside on other computer hardware (e.g., another computer of a virtual computer cluster). The application may be migrated in order to upgrade the operating system. In such a situation, an upgraded operating system is first deployed on the other computing platform and then the application is migrated through coordination conducted by the operating system and the upgraded operating system. Alternatively, the application may be migrated in order to balance a load among host computers.

Figure 11:
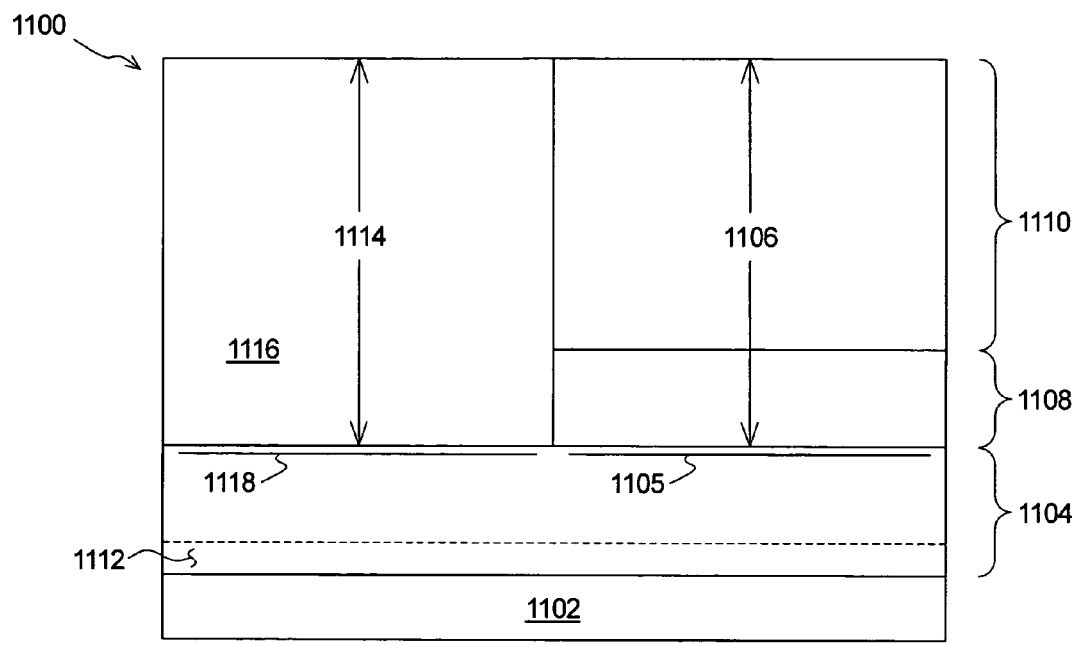
FIG. 11 schematically illustrates an embodiment of another computer system of the present invention.

An alternative embodiment of a computer system which is managed by the method 900 is illustrated schematically in FIG. 11. The computer system 1100 comprises computer hardware 1102 (e.g., a processor, memory, and a network interface), a virtual machine monitor 1104, a first computing platform 1106, and a second computing platform 1114. Typically, an operating system which includes an operating system kernel 1108 is placed on the computing platform 1114. Typically, in operation, a user of the computing platform 1106 will run an application or applications at a user level 1110 of the computing platform 1106. The virtual machine monitor 1104 includes a virtual machine interface 1105 which protects against non-physical tampering with the virtual machine monitor 1104 or the computer hardware 1102 by the user of the computing platform 1106.

According to an embodiment, the second step 904 of the method 900 (FIG. 9) adds a module 1112 to the virtual machine monitor 1104. In an embodiment, the second computing platform 1114 includes a management station 1116. The management station 1116 may add the module 1112 to the virtual machine monitor 1104. In such a situation, the virtual machine monitor 1104 includes a management API 1118 which allows the management station 1116 to access the virtual machine monitor 1104 and to add the module 1112 to the virtual machine monitor 1104. The management station 1116 may be allowed access to virtual machine monitors of other computer systems of a shared computing environment in which the computer system 1100 resides. In such a situation, the management station 1116 may add modules to at least some of the virtual machine monitors of the other computer systems.

Figure 12:
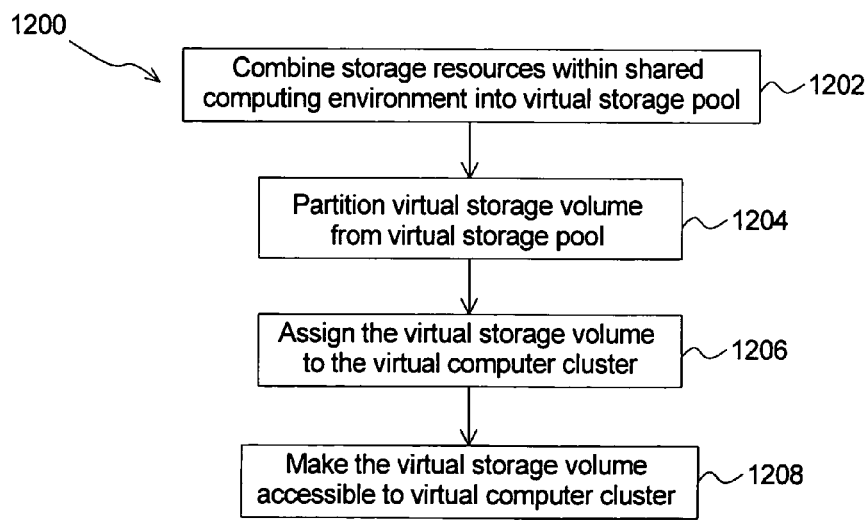
FIG. 12 illustrates a method of providing storage to a virtual computer cluster of the present invention as a flow chart.

An embodiment of a method of providing storage to a virtual computer cluster within a shared computing environment of the present invention is illustrated as a flow chart in FIG. 12. The method 1200 begins with a first step 1202 of combining storage resources within a shared computing environment into a virtual storage pool. The virtual storage pool comprises at least portions of storage devices in which at least one of the storage devices is not directly accessible by all computers which directly access any of the storage devices. First and second examples below illustrate this concept.

In the first example, the method 1200 is employed on the shared computing environment 200 (FIG. 2). According to this example, the storage resources comprise the disk arrays 204 (i.e., network attached storage) and the disk array 220 (i.e., direct attached storage for a particular host computer). The host computers 202 each couple to the disk arrays 204 via the SAN 206. This makes the disk arrays 204 directly accessible by the host computers 202. In contrast, the disk array 220 is directly accessible by only the first host computer 202A. Since the disk array 220 is not directly accessible by others of the host computers 202 and all of the host computers 202 can directly access the disk arrays 204, the storage resources comprising the disk arrays 204 and the disk array 220 comprise storage devices which are not directly accessible by all of the computers which directly access the disk arrays 204 and the disk array 220.

In the second example, the method 1200 (FIG. 12) is employed on the alternative shared computing environment 800 (FIG. 8). According to this example, the first step 1202 pools storage resources comprising first and second storage disks, 820A and 820B, which form portions of first and second host computers, 802A and 802B, respectively. Here, the first host computer 802A directly accesses the first storage disk 820A but not the second storage disk 820B and the second host computer 820B directly accesses the second storage disk 820B but not the first storage disk 820A.

The method 1200 (FIG. 12) continues with a second step 1204 of partitioning a virtual storage volume from the pooled storage resources. For example, the second step 1204 partitions a first LUN (logical unit) and a second LUN from the disk arrays 204 (FIG. 2) and the disk array 220, respectively. According to this example, the virtual storage volume comprises the first and second LUNs. This may be accomplished by concatenating the first and second LUNs or using the technique of striping on the first and second LUNs to form the virtual storage volume. Alternatively, the virtual storage volume may be mirrored in the first and second LUNs.

In a third step 1208, the method 1200 assigns the virtual storage volume to the virtual computer cluster. The method 1200 concludes with a fourth step 1208 of making the virtual storage volume accessible to computing platforms within the virtual computer cluster. The fourth step 1208 uses gatekeeper software which is protected against non-physical tampering by a user of the virtual computer cluster. The gatekeeper software resides on each of a plurality of computers which host the computing platforms of the virtual computer cluster. In an embodiment, a main section of the gatekeeper software performs the fourth step 1208. In another embodiment, a module which enhances the gatekeeper software performs the fourth step 1208.

In an embodiment, the gatekeeper software comprises a virtual volume manager, which performs the fourth step 1208. The virtual volume manager provides a mapping of virtual LUNs to LUNs within storage resources (e.g., storage resources within the shared computing environment 200 of FIG. 2). The virtual LUNs are provided to operating systems of the computing platform which form the virtual computer cluster. The operating systems use the virtual LUNs when reading and writing data within the virtual storage volume. When a virtual volume manager receives an access request for the virtual storage volume, the virtual volume manager translates a virtual LUN received from an operating system to a particular LUN within the storage resources for the shared computing environment. The gatekeeper software then routes the request accordingly.

In an exemplary embodiment, the virtual computer cluster comprises first and second computing platforms residing on the first and second host computers, 202A and 202B (FIG. 2), respectively. In another exemplary embodiment, the first and second computing platforms reside on the second host computer 202B and a third host computer 202C. In yet another exemplary embodiment, the first and second computing platforms reside on the first and second host computers, 802A and 802B (FIG. 8), respectively, of the alternative shared computing environment 800.

According to an embodiment, the method 1200 (FIG. 12) further comprises a step of controlling access to the virtual storage volume. In an embodiment the gatekeeper performs the step of controlling access to the virtual storage volume by encrypting write data destined for the virtual storage volume and decrypting read data arriving from the virtual storage volume. Preferably, the encryption and decryption is not visible from within the computing platform which sends and receives the data.

In another embodiment, gatekeeper software on each of the host computers 202 within the shared computing environment performs the step of controlling access to the virtual storage volume. Here, the host computers 202 each comprise a virtual machine monitor which separates a user accessible computing platform on each of the host computers from hardware. The gatekeeper software resides in the virtual machine monitor of each of the host computers 202. The gatekeeper software controls access to the virtual storage volume by precluding access to storage resources not within an assigned virtual storage volume for each of the user accessible computing platforms.

According to an embodiment, the method 1200 (FIG. 12) further comprises a step of striping the virtual storage volume across a plurality of storage devices (e.g., RAID 0). According to another embodiment, the method 1200 further comprises mirroring the virtual storage volume across a plurality of storage devices (e.g., RAID 1).

According to an embodiment, the method 1200 further comprises erasure coding the virtual storage volume across a plurality of storage devices (e.g., RAID 5). The erasure coding allows one or more lost data blocks to be reconstructed from remaining data blocks. According to an embodiment, the method 1200 further comprises a step of shaping storage traffic between the virtual computer cluster and the virtual storage volume. The step of shaping the storage traffic may include delaying storage traffic. The step of shaping the storage traffic may include batching the storage traffic. Or, the step of shaping the storage traffic may include re-ordering storage traffic requests.

According to an embodiment, the method 1200 further comprises a step of migrating at least a portion of the virtual storage volume from a source storage device to a destination storage device. During a migration of a portion of the virtual storage volume from a source storage device to a destination storage device, the method 1200 may include first and second additional steps. The first additional step comprises storing write data upon both the source and destination storage devices. The second additional step comprises accessing read data from the source storage device.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of forming a virtual computer cluster within a shared computing environment comprising the steps of:
    placing gatekeeper software on each of a plurality of particular host computers of the shared computing environment;
    assigning computing platforms located on the particular host computers to the virtual computer cluster such that the gatekeeper software interposes between the computing platforms and hardware resources of the particular host computers; and
    isolating the virtual computer cluster from a remainder of the shared computing environment using the gatekeeper software such that the gatekeeper software allows communication between the computing platforms while precluding communication with other computing platforms of the shared computing environment and such that the gatekeeper software controls input and output operations for the virtual computer cluster.

2. The method of claim 1 wherein each computing platform comprises a processing capacity and memory.

3. The method of claim 2 further comprising the step of assigning a storage capacity from within the shared computing environment to the virtual computer cluster.

4. The method of claim 3 wherein the storage capacity of the virtual computer cluster comprises a portion of storage resources within a storage area network.

5. The method of claim 4 wherein control of the input and output operations by the gatekeeper software includes allowing access to the portion of the storage resources within the storage area network while precluding access to remaining storage resources within the storage area network.

6. The method of claim 2 wherein the storage capacity of a particular computer of the shared computing environment comprises local storage.

7. The method of claim 6 wherein the local storage comprises direct attached storage.

8. The method of claim 6 wherein the particular computer does not host any of the computing platforms of the virtual computer cluster.

9. The method of claim 2 wherein the storage capacity of the virtual computer cluster comprises network attached storage.

10. The method of claim 1 wherein the shared computing environment comprises host computers coupled together by a network and each host computer comprises the gatekeeper software.

11. The method of claim 10 wherein the gatekeeper software controls network communication for each of the host computers.

12. The method of claim 11 wherein the gatekeeper software further controls input and output for each of the host computers.

13. The method of claim 10 wherein at least some of the host computers each comprise hardware and a virtual machine monitor.

14. The method of claim 13 wherein the virtual computer cluster comprises first and second computing platforms, and the first and second computing platforms comprise first and second virtual machines, respectively.

15. The method of claim 14 wherein the first and second virtual machines reside on first and second host computers, respectively.

16. The method of claim 15 wherein the step of isolating the computing platforms from the remainder of the shared computing environment comprises modifying the gatekeeper software within the virtual machine monitors of the first and second host computers to allow communication between the operating systems of the first and second computing platforms while precluding communication with other assignable computing platforms of the shared computing environments which are not within the virtual computer cluster.

17. The method of claim 14 wherein the first virtual machine and a third virtual machine reside on the first host computer.

18. The method of claim 17 wherein the virtual computer cluster does not include the third virtual machine.

19. The method of claim 18 wherein another virtual computer cluster comprises the third virtual machine.

20. The method of claim 19 wherein the gatekeeper software precludes communication between the first and third virtual machines.

21. The method of claim 18 wherein the third virtual machine comprises a management station for the shared computing environment.

22. The method of claim 10 wherein the virtual computer cluster comprises first and second computing platforms residing on first and second host computers, respectively, and the gatekeeper software of each of the first and second host computers comprises an operating system daemon.

23. The method of claim 22 wherein the step of isolating the computing platforms from the remainder of the shared computing environment comprises activating the operating system daemons within the operating systems of the first and second host computers to allow communication between the operating systems of the first and second host computers while precluding communication with other assignable computing platforms which are not within the virtual computer cluster.

24. The method of claim 23 wherein the hardware of each of the first and second computers comprises a trusted computing module which protects against a user of the virtual computer cluster interfering with the operating system daemons of the first and second host computers.

25. The method of claim 23 wherein each of the first and second host computers comprise a virtual machine monitor, the operating system of each of the first and second host computers separate hardware from the virtual machine monitor, and the virtual machine monitor of each of the first and second host computers precludes a user of the virtual computer cluster from interfering with the operating system daemons of the first and second host computers.

26. The method of claim 10 wherein the host computers each comprise a trusted computing module.

27. The method of claim 26 further comprising the step of quarantining one of the host computers upon the trusted computing module of the host computer detecting malicious activity within the host computer.

28. The method of claim 1 wherein the step of isolating the computing platforms from the remainder of the shared computing environment comprises allowing communication between the virtual computer cluster and a management station of the shared computing environment.

29. The method of claim 1 wherein the shared computing environment is physically isolated from the user of the virtual cluster to protect against physical tampering by the user of the virtual computer cluster.

30. A method of forming a virtual computer cluster within a shared computing environment comprising the steps of:
assigning virtual machines located on particular host computers of the shared computing environment to the virtual computer cluster; and
isolating the virtual machines from a remainder of the shared computing environment using gatekeeper software located in a virtual machine monitor of each of the particular host computers, the virtual machine monitors of the particular host computers separating an operating system from hardware for each of the particular host computers, the gatekeeper software allowing communication between the computing platforms while precluding communication with other computing platforms of the shared computing environment, the gatekeeper software controlling input and output operations for the virtual computer cluster.

31. The method of claim 30 wherein the step of isolating the virtual machines from the remainder of the shared computing environment comprises modifying the gatekeeper software within the virtual machine monitors of the particular host computers to allow communication between the operating systems of the virtual machines while precluding communication with other assignable virtual machines of the shared computing environments which are not within the virtual computer cluster.

32. The method of claim 30 wherein one of the particular host computers further comprises a management virtual machine.

33. The method of claim 32 wherein the virtual machine monitor of the particular host computer which includes the management virtual machine comprises a management application program interface which allows the management virtual machines to modify the gatekeeper software of the particular host computers to instantiate the step of isolating the virtual machines from the remainder of the shared computing environment.

34. A method of forming a virtual computer cluster within a shared computing environment comprising the steps of:
assigning virtual machines located on particular host computers of the shared computing environment to the virtual computer cluster; and
isolating the virtual machines from a remainder of the shared computing environment using an operating system daemon on each of the particular host computers which is protected against non-physical tampering by a trusted computing module, the operating system daemons allowing communication between the computing platforms while precluding communication with other computing platforms of the shared computing environment, the operating system daemons controlling input and output operations for the virtual computer cluster.

35. A computer readable media comprising computer code for implementing a method of forming a virtual computer cluster within a shared computing environment, the method of forming the virtual computer cluster comprising the steps of:
placing gatekeeper software on each of a plurality of particular host computers of the shared computing environment;

assigning computing platforms located on the particular host computers to the virtual computer cluster such that the gatekeeper software interposes between the computing platforms and hardware resources of the particular host computers; and isolating the virtual computer cluster from a remainder of the shared computing environment using the gatekeeper software such that the gatekeeper software allows communication between the computing platforms while precluding communication with other computing platforms of the shared computing environment and such that the gatekeeper software controls input and output operations for the virtual computer cluster.

36. A computer readable media comprising computer code for implementing a method of forming a virtual computer cluster within a shared computing environment, the method of forming the virtual computer cluster comprising the steps of:

assigning virtual machines located on particular host computers of the shared computing environment to the virtual computer cluster; and isolating the virtual machines from a remainder of the shared computing environment using an operating system daemon on each of the particular host computers which is protected against non-physical tampering by a trusted computing module, the operating system daemons allowing communication between the computing platforms while precluding communication with other computing platforms of the shared computing environment, the operating system daemons controlling input and output operations for the virtual computer cluster.

37. A computer readable media comprising computer code for implementing a method of forming a virtual computer cluster within a shared computing environment, the method of forming the virtual computer cluster comprising the steps of:

assigning virtual machines located on particular host computers of the shared computing environment to the virtual computer cluster; and isolating the virtual machines from a remainder of the shared computing environment using an operating system daemon on each of the particular host computers which is protected against non-physical tampering by a trusted computing module, the operating system daemons allowing communication between the computing platforms while precluding communication with other computing platforms of the shared computing environment, the operating system daemons controlling input and output operations for the virtual computer cluster.

* * * * *